US008325643B2

(12) United States Patent
Tocze et al.

(10) Patent No.: US 8,325,643 B2
(45) Date of Patent: Dec. 4, 2012

(54) METHOD FOR DETERMINING A SEQUENCE OF ACCESS TO A COMMUNICATIONS NETWORK, CORRESPONDING COMPUTER PROGRAM PRODUCT, STORAGE MEANS AND DEVICES

(75) Inventors: Lionel Tocze, Saint Domineuc (FR); Patrice Nezou, Guignen (FR); Alain Caillerie, Rennes (FR); Pascal Lagrange, Rennes (FR); Julien Sevin-Renault, St. Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 12/596,415

(22) PCT Filed: Jun. 12, 2008

(86) PCT No.: PCT/EP2008/057429
§ 371 (c)(1),
(2), (4) Date: Apr. 5, 2010

(87) PCT Pub. No.: WO2008/152113
PCT Pub. Date: Dec. 18, 2008

(65) Prior Publication Data
US 2010/0195556 A1 Aug. 5, 2010

(30) Foreign Application Priority Data
Jun. 15, 2007 (FR) ...................................... 07 55799

(51) Int. Cl.
*H04H 20/71* (2008.01)

(52) U.S. Cl. ........ 370/312; 370/357; 370/360; 710/240; 710/241; 710/244

(58) Field of Classification Search .................. 370/256, 370/355, 342, 347; 455/445, 456.2
See application file for complete search history.

(56) References Cited

U.S. PATENT DOCUMENTS

| | | | |
|---|---|---|---|
| 6,229,799 B1 * | 5/2001 | Caillerie et al. ............... 370/347 |
| 6,826,401 B1 | 11/2004 | Morvan et al. |
| 7,159,042 B1 | 1/2007 | Morvan et al. |
| 7,185,077 B1 * | 2/2007 | O'Toole et al. ................ 709/223 |
| 7,299,311 B1 * | 11/2007 | Sepeda et al. .................. 710/116 |
| 7,468,963 B2 * | 12/2008 | Capretta ........................ 370/329 |
| 7,990,927 B2 * | 8/2011 | Choi et al. ..................... 370/335 |
| 2003/0091014 A1 | 5/2003 | Meier |
| 2009/0143024 A1 | 6/2009 | Tocze et al. |
| 2009/0161572 A1 | 6/2009 | Lagrange et al. |

FOREIGN PATENT DOCUMENTS
EP 1772999 A2 11/2007

OTHER PUBLICATIONS

Lagrange, et al., U.S. Appl. No. 12/626,741, filed Nov. 27, 2009.
Thoumy, et al., U.S. Appl. No. 12/686,699, filed Jan. 13, 2010.

* cited by examiner

*Primary Examiner* — Robert W Wilson
*Assistant Examiner* — Mohamed Kamara
(74) *Attorney, Agent, or Firm* — Fitzpatrick, Cella, Harper & Scinto

(57) ABSTRACT

The invention pertains to a method for determining a sequence of access (300) to a communications network (100) by a plurality of nodes (101, 102, 103, 5 104, 107) of said communications network (100) in the context of the broadcasting of a data content by a transmitter node (101) to a set of receiver nodes (103, 107, 104, 102), at least one receiver node (102, 104) having to receive said content by means of another receiver node (103, 107), called a relay receiver node.

13 Claims, 9 Drawing Sheets

NT_WAS1
| WSC-R |
| WAS2 |
| WAS3 |
| WAS5 |

NT_WAS2
| WAS1 |
| WAS3 |

NT_WAS3
| WAS2 |
| WAS4 |
| WSC-R |
| WAS8 |

NT_WAS4
| WAS3 |
| WAS6 |
| WAS8 |

NT_WAS5
| WSC-L |
| WAS7 |
| WAS1 |
| WAS6 |

NT_WAS6
| WAS5 |
| WAS8 |
| WAS7 |
| WSC-L |
| WAS4 |

NT_WAS7
| WSC-L |
| WAS5 |
| WAS6 |

NT_WAS8
| WAS6 |
| WAS3 |
| WAS4 |

NT_WSC-L
| WAS5 |
| WAS7 |
| WAS6 |
| WAS1 |

NT_WSC-R
| WAS1 |
| WAS3 |

Figure 5

METHOD FOR DETERMINING A SEQUENCE OF ACCESS TO A COMMUNICATIONS NETWORK, CORRESPONDING COMPUTER PROGRAM PRODUCT, STORAGE MEANS AND DEVICES

1. FIELD OF THE INVENTION

The field of the invention is that of the transmission of data contents in a communications network.

The invention pertains especially to the transmission of data contents in a synchronous wireless home communications network comprising a plurality of receiver nodes and, more particularly, the transmission of contents in a 60 GHz radio transmission system.

60 GHz radio transmission systems are particularly well suited to the transmission of data at very high bit rate over short distances. For example, a transmission system of this kind is well suited to connectivity between the different elements of a home cinema. For this case of use, the range of transmission is limited to about ten meters but the bit rates brought into play are very high, sometimes over one gigabyte per second, because of the nature (both audio and video) and the high resolution of the information transmitted. In order to limit the power needed to transmit data in a 60 GHz radio system, it is preferable to use electronically steerable antennas. These antennas are actually matrices of electromagnetic cells activated so as to define an angle (orientation) of data transmission and/or reception.

The transmission of data in such networks can be done by means of super-frames. Each super frame comprises several frames containing the data to be transmitted.

2. PRIOR ART SOLUTIONS

In a wireless home communications network, it is possible to ensure transmission time by dividing a network cycle into fixed time intervals (also called "frames" or "speech sequences") so that each node uses one frame for the communication of data, each node thus sending in turn through its associated frame at predetermined points in time in a cycle of the communications network. Such a technique is known as TDM (time division multiplex) or TDMA (time division multiple access) frequently used in wireless communications networks.

There is also another transmission technique known as burst transmission in which a large quantity of data is transmitted in a same frame, the frame being then no longer predefined.

Whatever the transmission technique used (TDMA mode or burst mode), each node of the communications network sends out data it must transmit in a frame of the super-frame implemented in the network according to a predefined and invariable transmission sequence. Thus, for each node, there is advance knowledge as to which nodes of the network will transmit data before and after this node.

Now, should an obstacle conceal the 60 GHz communication (which is directional) between a source node of content and a receiver node of the content in the network, at least one relay node, which is a receiver of the content, retransmits the content to the receiver node (or destination node of the relay) in order to generate indirect communication between the source node and the receiver node that replaces the direct communication made non-operative by the obstacle.

Thus, in the context of the implementation of a predefined and invariable transmission sequence for the transmission of the content of the source node to a plurality of receiver nodes in such a network comprising an obstacle, depending on the sequence, it may happen that the transmission of the content to each of the receiver nodes of the network requires the implementation of at least two super-frames (or two network cycles) owing to retransmission by the relay nodes.

Thus, the implementation of this classic technique of transmission leads to latency (or transmission time for a data content in the network) that may be great depending on the topology of the network (especially when obstacles are present).

3. GOALS OF THE INVENTION

The invention, in at least one embodiment, is aimed especially at overcoming these drawbacks of the prior art.

More specifically, it is a goal of the invention, in at least one of its embodiments, to provide a technique in a communications network comprising several receiver nodes receiving at least one data content, for minimizing the time for transmission of the content in this communications network.

It is yet another goal of the invention, in at least one of its embodiments, to provide a technique of this kind to take account of the topology of the network and especially the presence of obstacles in the network.

Yet another goal of the invention, in at least one of its embodiments, is to provide a technique of this kind that can be used to take account of the possibility of appearance of masking or shadowing in the topology of the network due to the temporary introduction of obstacles in the network.

The invention, in at least one of its embodiments, is also aimed at implementing a technique of this kind that is simple to use and costs little.

4. SUMMARY OF THE INVENTION

In one particular embodiment of the invention, a method is proposed for determining a sequence of access to a communications network by a plurality of nodes of said communications network in the context of the broadcasting of a data content by a sender or transmitter node to a set of receiver nodes, at least one receiver node having to receive said content by means of another receiver node, called a relay receiver node.

According to a particular embodiment, the method of the invention comprises the following steps implemented by a manager device:

for each receiver node, determining at least one filial link with at least one other node of the communications network, a filial link existing between two nodes when a direct communication between the two nodes is possible;

determining a hierarchical tree whose root is the transmitter node, on the basis of a selection of a set of determined filial links, as a function of at least one rule of spatial diversity, said hierarchical tree defining at least one relay receiver node and enabling the reception of the content by the set of receiver nodes;

determining said sequence of access from the hierarchical tree so that, between access by said relay receiver node or nodes and access by the receiver node or nodes linked to it or to them by the filial links of said hierarchical tree, the sequence of access provides that at least one other node will access the communications network.

The general principle of the invention, in the context of the transmission of at least one content in a communications network, relies first of all on the making of a hierarchical tree comprising several relay levels or hop levels in which the plurality of nodes of the network is ordered in taking account of the topology of the network (especially the presence of obstacles in the network). The hierarchical tree thus obtained is then used to determine the ordering of the access of the nodes to the network in the context of the broadcasting of a content so as to minimize the time of transmission of the content in the network, in ensuring that a node that has to relay the content to at least one other node of the network can carry out the necessary processing needed for this data relay or data hop, such as for example processing operations associated with error correction or operations for reformatting data packets.

Advantageously, the determining of at least one filial link includes a step for determining a piece of information representing a level of communications between the nodes of the communications network and the determining of the hierarchical tree is done as a function of said piece or pieces of information representing a level of communication.

Thus, the information representing a level of communication between the nodes of the network is used to determine the relay nodes of the hierarchical tree in direct communication with the transmitter node.

Advantageously, one of said rules of spatial diversity requires that a determined filial link should be selected to determine the hierarchical tree if the information representing a level of communications between the nodes linked by said filial link is greater than a predetermined threshold.

Thus, only the links between the nodes of the network that enable communication of sufficient quality between the nodes are taken into account when determining the sequence of access to the communications network.

According to an advantageous characteristic, one of said rules of spatial diversity requires that each of the receiver nodes should have two filial links in the hierarchical tree enabling it to receive the content.

Thus, the criterion of spatial diversity dictates two filial links with which to ensure the reception of the data content by the receiver node despite the appearance of masking in the topology of the network due to the temporary introduction of obstacles into the network, while at the same time enabling the sequence of access to the network to provide for access by at least another node to the communications network between the access by a relay receiver node and access by the receiver node or nodes connected to it or to them by the filial links of the hierarchical tree.

Advantageously, with the transmitter node having several antennas enabling access to the communications network, the hierarchical tree being constituted by as many branches as there are transmitter node antennas, one of said rules of spatial diversity dictates a balancing of the hierarchical tree relative to the transmitter node.

This criterion of balancing of the hierarchical tree relative to the transmitter node provides for the delivery of an equitable distribution of the relay receiver nodes on each branch of the hierarchical tree, thus also minimizing transmission time for the data content in the network. This also enables a distribution of the dependencies of the nodes relative to one another for the broadcasting of the content and thus restricts the risks of non-reception of content by at least one of the nodes during the temporary masking that appears in the communications network.

Advantageously, said sequence furthermore provides for access by a first receiver node to the communications network before a second receiver node in the sequence if at least one of the following criteria is verified:

the first receiver node has a filial link with the transmitter node while the second receiver node has no filial link with the transmitter node;

the first receiver node is a relay receiver node while the second receiver node is not a relay receiver node;

the first and second receiver nodes being relay receiver nodes to enable the reception of the content at respectively first and second relay recipient receiver nodes, the number of first relay recipient receiver nodes is greater than the number of second relay recipient receiver nodes;

the first and second receiver nodes being relay receiver nodes to enable the reception of the content at respectively first and second relay recipient receiver nodes, at least one of the first relay recipient receiver nodes is a relay node while none of the second relay recipient receiver nodes is a relay node.

In another embodiment, there is proposed a computer program product, downloadable from a communications network and/or recorded on a computer-readable support and/or executable by a processor, characterized in that it comprises program code instructions for the implementation of the method of determination as described here above.

In another embodiment, there is proposed a computer-readable storage means, which may be totally or partially detachable, storing a set of instructions executable by said computer to implement the determining method as described here above.

In another embodiment, a manager device is proposed to determine a sequence of access to a communications network by a plurality of nodes of said communications network in the context of the broadcasting of a data content by a transmitter node to a set of receiver nodes, at least one receiver node having to receive said content by means of another receiver node, called a relay receiver node.

According to this other embodiment, the manager device comprises:

means of determining, for each receiver node, at least one filial link with at least one other node of the communications network, a filial link existing between two nodes when a direct communication between the two nodes is possible;

means of determining a hierarchical tree whose root is the transmitter node, on the basis of a selection of a set of determined filial links, as a function of at least one rule of spatial diversity, said hierarchical tree defining at least one relay receiver node and enabling the reception of the content by the set of receiver nodes;

means of determining said sequence of access from the hierarchical tree so that, between access by said relay receiver node or nodes and access by the receiver node or nodes linked to it or to them by the filial links of said hierarchical tree, the sequence of access provides that at least one other node will access the communications network.

The advantages of the computer program product, storage means and manager device are the same as those of the above-mentioned determining method and shall not be described in fuller detail.

Advantageously, the means of determining at least one filial link comprise means of determining a piece of information representing a level of communications between the nodes of the communications network and the means of determining the hierarchical tree comprise means for taking account of said piece or pieces of information representing a level of communication.

Advantageously, one of said rules of spatial diversity requires that a determined filial link should be selected to determine the hierarchical tree if the information representing a level of communications between the nodes linked by said filial link is greater than a predetermined threshold.

According to an advantageous characteristic, one of said rules of spatial diversity requires that each of the receiver nodes should have two filial links in the hierarchical tree enabling it to receive the content.

Advantageously, with the transmitter node having several antennas for access to the communications network, the hierarchical tree being constituted by as many branches as there are transmitter node antennas, one of said rules of spatial diversity dictates a balancing of the hierarchical tree relative to the transmitter node.

Advantageously, said means for determining said sequence of access are such that said sequence furthermore provides for access by a first receiver node to the communications network before a second receiver node in the sequence if at least one of the following criteria is verified:

- the first receiver node has a filial link with the transmitter node while the second receiver node has no filial link with the transmitter node;
- the first receiver node is a relay receiver node while the second receiver node is not a relay receiver node;
- the first and second receiver nodes being relay receiver nodes to enable the reception of the content at respectively first and second relay recipient receiver nodes, the number of first relay recipient receiver nodes is greater than the number of second relay recipient receiver nodes;
- the first and second receiver nodes being relay receiver nodes to enable the reception of the content at respectively first and second relay recipient receiver nodes, at least one of the first relay recipient receiver nodes is a relay node while none of the second relay recipient receiver nodes is a relay node.

Furthermore, a technique of this kind is compatible with a communications network implementing multipoint-to-multipoint type communications or point-to-multipoint type communications.

5. LIST OF FIGURES

Other features and advantages of the invention shall appear more clearly from the following description of a preferred embodiment, given by way of a simple illustrated and non-restrictive example, and from the appended figures, of which:

Figure 1:
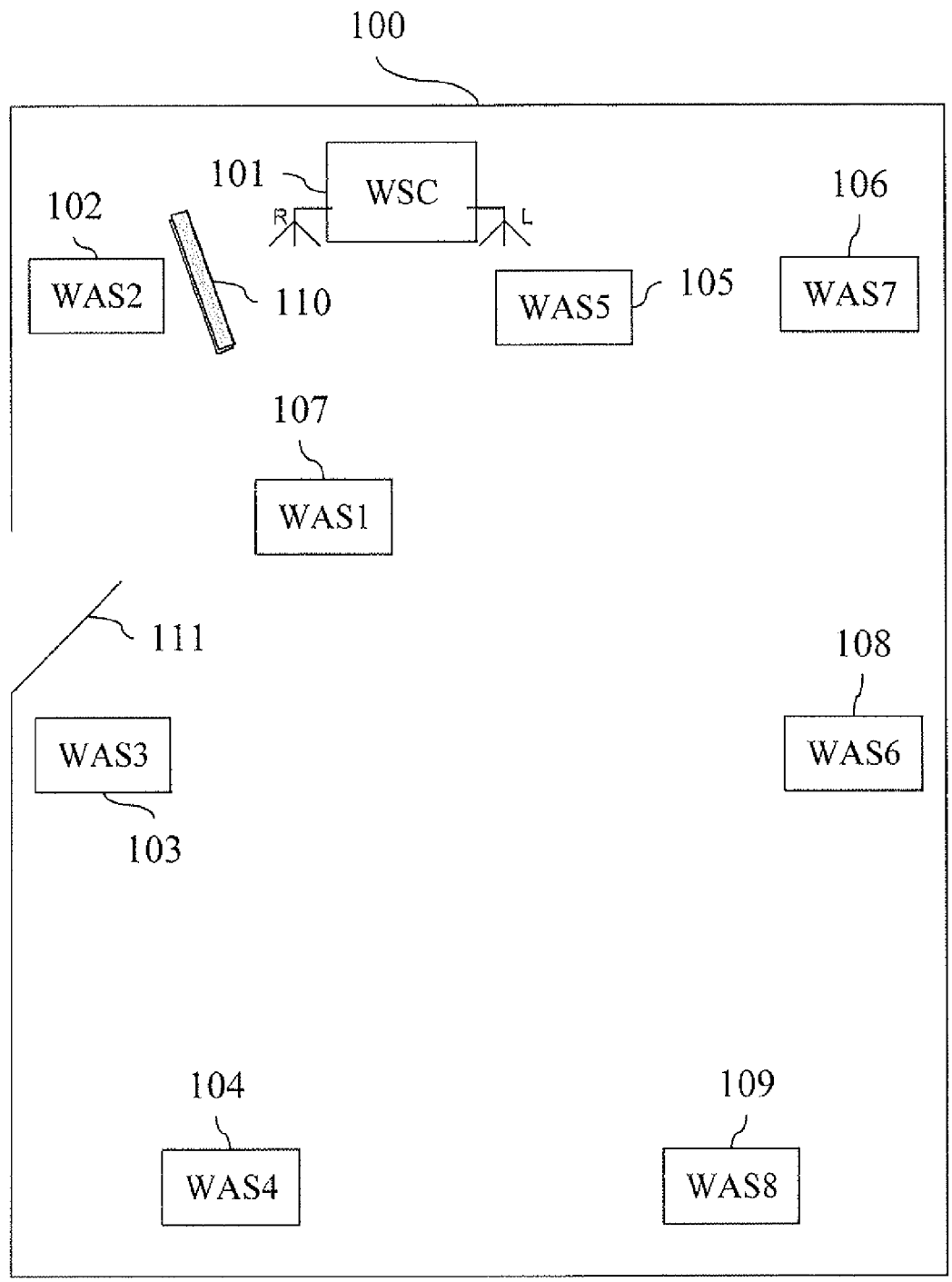
FIG. 1 is a diagram of a communications network in which it is possible to implement a method for determining a sequence according to one particular embodiment of the invention.
Figure 4:
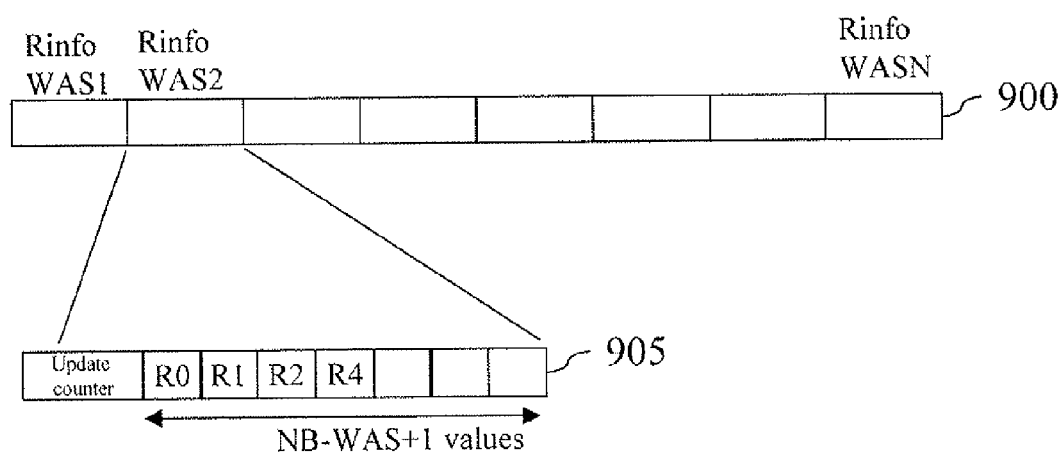
Figure 6:
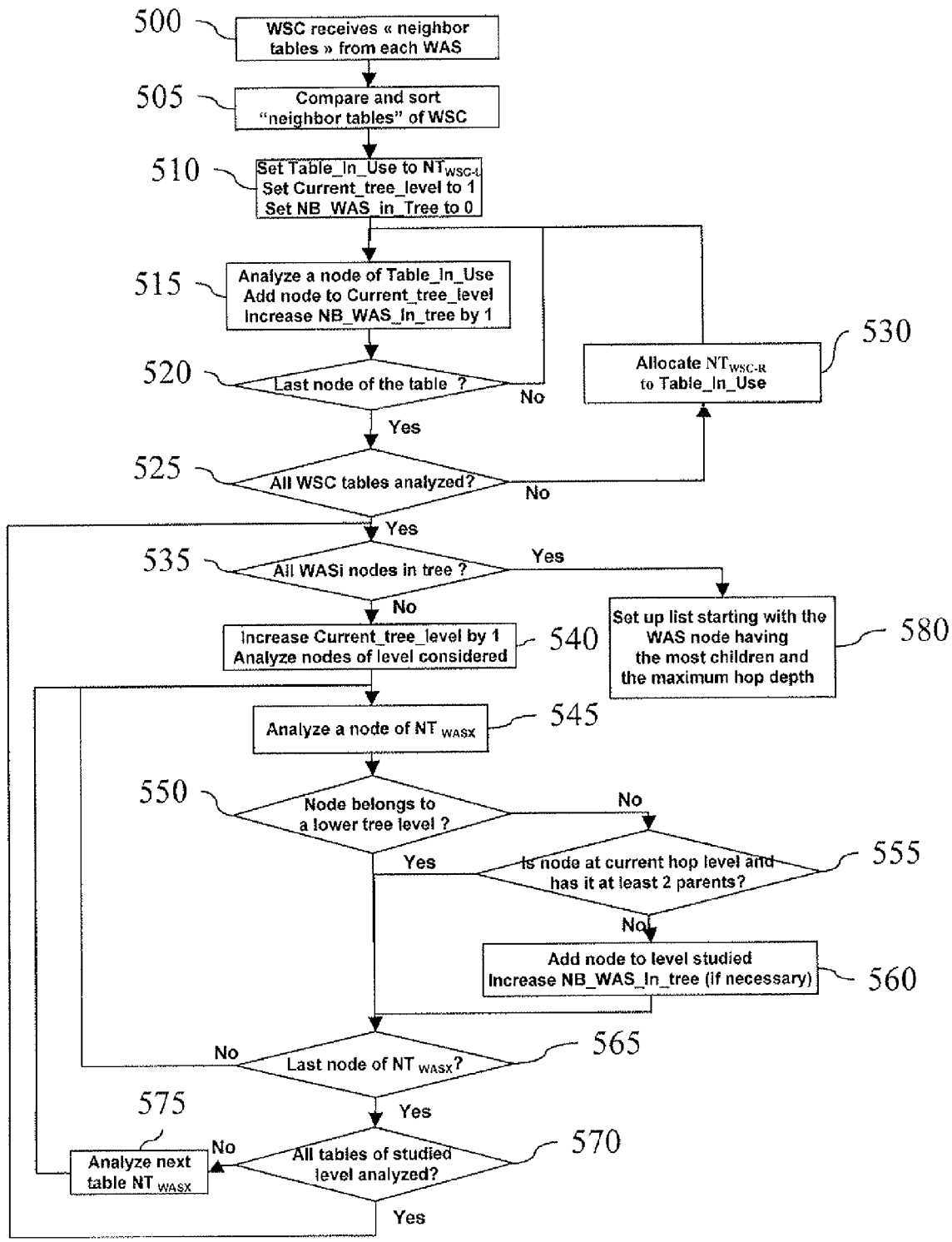
Figure 7:
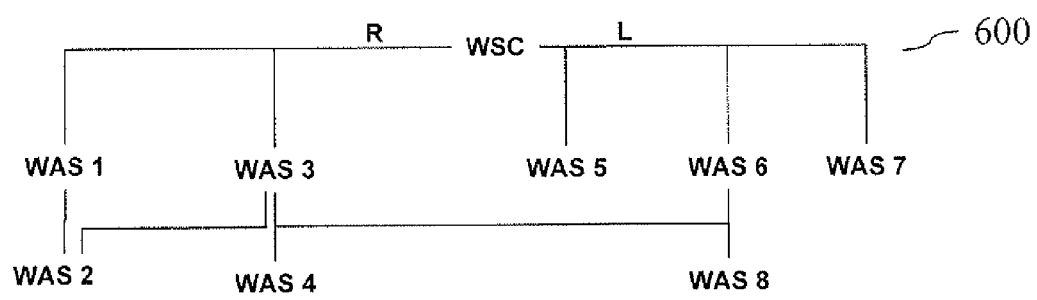
Figure 8:
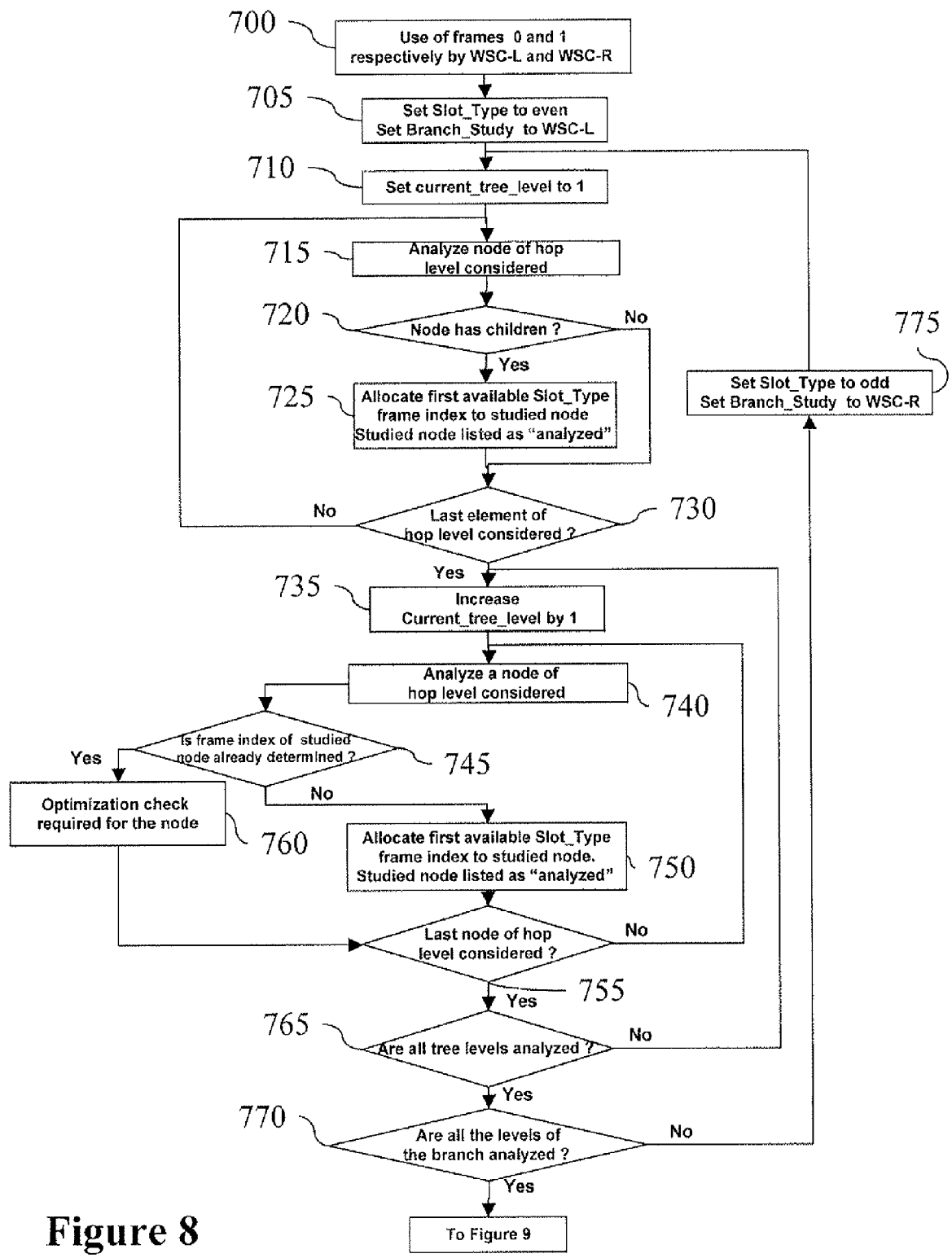
Figure 9:
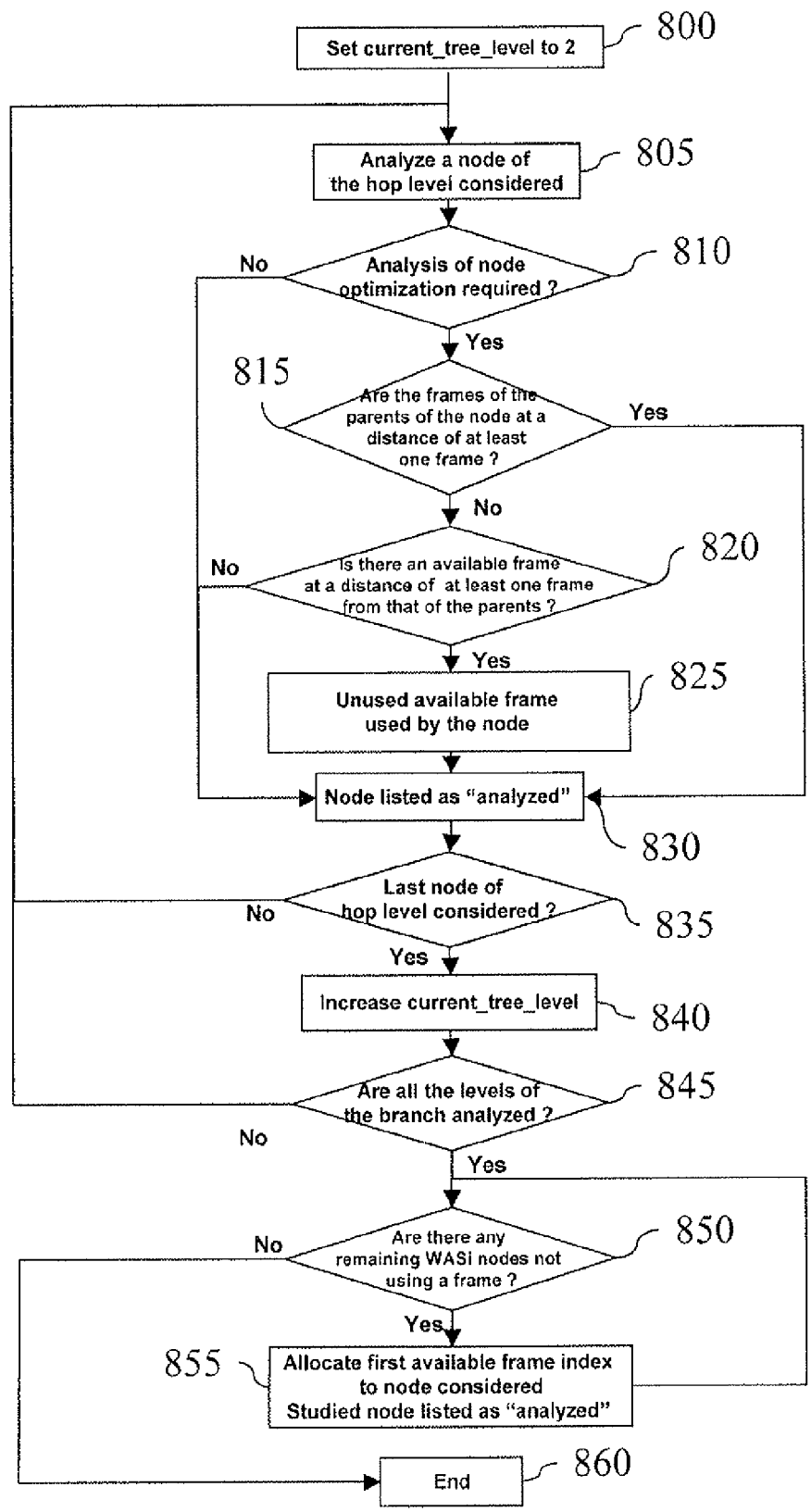

FIG. 4 presents the structure of a general table of RSSI information elements according to the particular embodiment of the invention;

FIG. 5 presents examples of tables of neighboring nodes associated with the nodes of the communications network of FIG. 1 according to the particular embodiment of the invention;

FIG. 6 provides a detailed description of the main steps of an algorithm for building a hierarchical tree whose root is the WSC node 101 according to the particular embodiment of the invention;

FIG. 7 illustrates the hierarchical tree obtained after implementation of the algorithm of FIG. 6 and the use of the tables of neighboring nodes FIG. 5 according to an example of the particular embodiment of the invention;

FIG. 8 presents the main steps of the first part of an algorithm for determining the order of transmission of the sequence of frames of a super-frame according to the particular embodiment of the invention;

FIG. 9 describes the main steps of the second part of the algorithm for determining the order of transmission of the sequence of frames introduced by FIG. 8 according to the particular embodiment of the invention.

6. DESCRIPTION OF AN EMBODIMENT OF THE INVENTION

In one particular application of the method for determining a sequence of access according to one particular embodiment of the invention, the following description is situated in the context of a communications network 100 which is a 7.1 type home cinema or home theatre network as illustrated by FIG. 1.

Naturally, the invention can also be applied in a 5.1 type home cinema network or even in any other communications network.

In the context of the 7.1 type home cinema network 100, the speakers are connected to an audio source by means of a wireless mesh network.

For example, the 7.1 home cinema network 100 comprises an audio-video source terminal (for example a DVD reader), a television screen (not illustrated), a first speaker 107, called a subwoofer, a second speaker 102, called a front-left speaker, a third speaker 103, called a side-left speaker, a fourth speaker 104, called a left ambience speaker, a fifth speaker 105, called a center speaker, a sixth speaker 106, called a front right speaker, a seventh speaker 108, called a lateral right speaker, and an eighth speaker 109, called a right ambience speaker. Each speaker plays one of the eight audio channels delivered by the source terminal.

In order to make the meshed wireless network, it is implemented: a wireless ambience controller 101 here below called a WSC ("Wireless Surround Controller") node 101 and wireless active speaker (WAS) nodes, namely a first node WAS1, second node WAS2, third node WAS3, fourth node WAS4, fifth node WAS5, sixth node WAS6, seventh node WAS7 and eighth node WAS8, hereinafter called nodes WASi, i going from 1 to N (N=8 in the particular embodiment of the invention), respectively associated with the first 107, second 102, third 103, fourth 104, fifth 105, sixth 108, seventh 106 and eighth 109 speakers mentioned here above.

Analog source devices (for example the above-mentioned audio-video source terminal) can be connected to the WSC node 101 and the communications network 100 then enables the broadcasting of an audio contents given by the analog source to the different speakers of the home cinema.

The function of a node WASi is to carry out an interface between the speaker with which it is associated and the WSC node 101 in the wireless mesh network.

Each of the nodes, namely the nodes WASi and the WSC node 101 is powered by means of a current connector (not shown). Each of the nodes WASi comprises an antenna (not shown) in order to implement wireless communications. This antenna is preferably an electronically controlled electromagnetic antenna.

The WSC node 101 comprises a first antenna referenced R positioned on the right-hand side of the WSC node 101 and a second antenna referenced L positioned on the left-hand side of the WSC node 101.

In order to improve the compactness of the system, the WSC node 101 can be integrated into the source terminal and each node WASi can be integrated into the speaker with which it is associated.

In order to achieve wireless communications in the network, 60 GHz radiofrequency (RF) transmission means or infrared (IR) transmission means are implemented in the communications network 100.

Furthermore, the communications network 100 can be subjected to interference or shadowing effects resulting from the presence of obstacles 110 or 111.

In the context of the network 100 FIG. 1, from a logic viewpoint, a 1-to-N (N=8) type communication, i.e. a point-to-multipoint communication, is made from the WSC node 101 to the 8 nodes WASi. Indeed, the WSC node is a transmitter of the audio content on the meshed network 100 and the nodes WASi are receivers of this audio content. Advantageously, each of the WSC and nodes WASi is capable of sending and receiving data, thus enabling the setting up of N-to-N or multipoint-to-multipoint type communications.

In the context of this broadcasting, the method for determining a sequence according to the invention (described in greater detail with reference to FIGS. 4 to 9) is implemented in the form of a software program and/or a plurality of software sub-programs (comprising a plurality of algorithms described here below) which is/are executed in several machines of the network 100, for example in the WSC node 101 (also called a manager device) and the nodes WASi.

Figure 2:
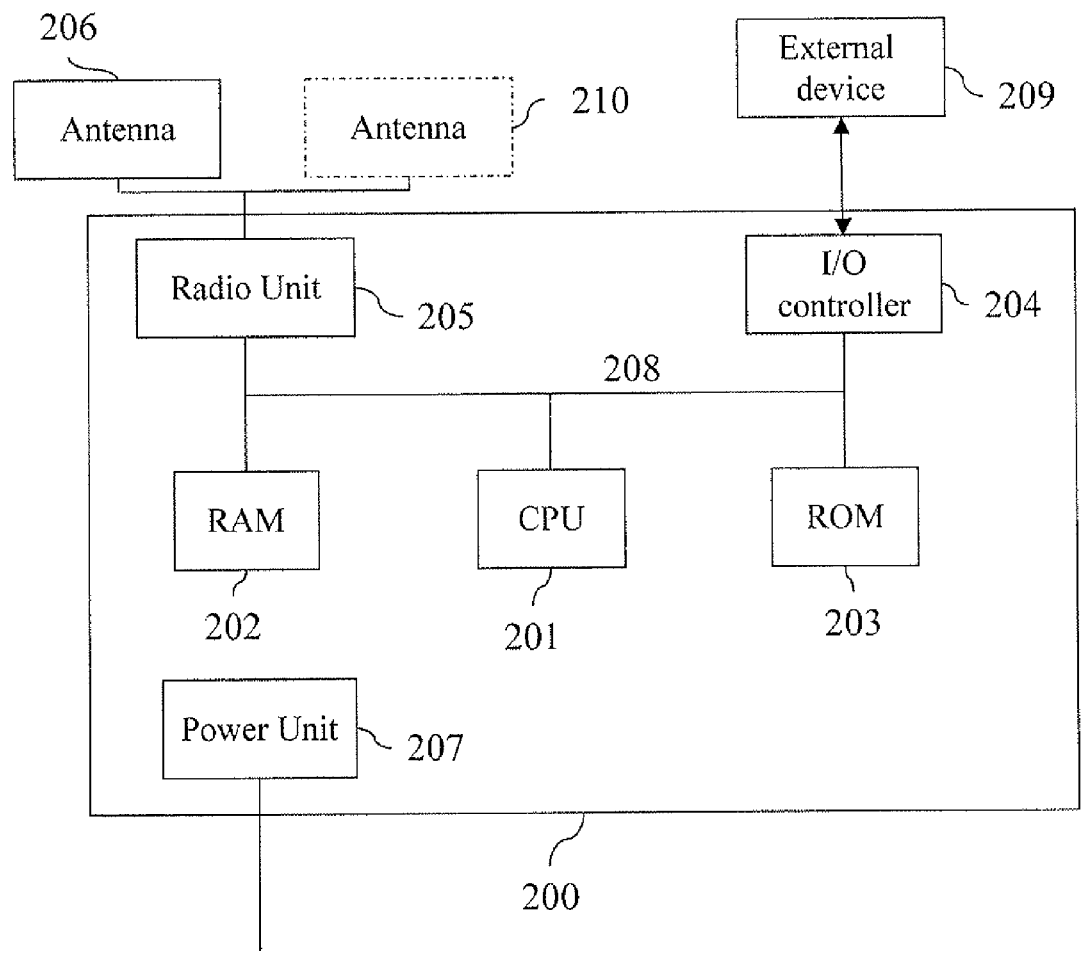
FIG. 2 is an example of the simplified architecture of a generic node according to the particular embodiment of the invention.

Referring to FIG. 2, a simplified architecture is presented of a generic node 200 identical to the WSC node or to each of the nodes WASi according to the particular embodiment of the invention.

The generic node 200 comprises:
an input/output controller 204 (also called an I/O controller) used for the connection of an external device 209 which may be:
  should the generic node 200 be the WSC node 101, a source terminal adapted to the WSC node 101, for example a DVD, Blue-Ray or HD DVD player. The source terminal gives multichannel digital audio data to the WSC node 101 using a digital audio (or audio-video) interface, compliant for example with the SPDIF ("Sony/Philips Digital InterFace") standard, the IEEE-1394 standard or the HDMI ("High Definition Multimedia Interface") standard;
  should the generic node 200 be a node WASi, a rendering terminal adapted to the node WASi which is an amplified audio speaker in the particular embodiment of the invention;
a random-access memory (RAM) 202 implemented by a processing unit 201 and enabling the temporary storage of data is used in the implementation of the method according to the particular embodiment of the invention. The RAM 202 can store information about each node WASi relating especially to the following variables:
"Nb_Parents", which is used to record the number of parents of a given node WASi, this number being determined from a hierarchical tree described here below. The initial value of Nb_Parents of the node WASi is equal to 0;
"Slot_Number", which is used to store the frame transmission index (or frame sequence index) sent out by the node WASi considered within the sequence of frames of a super-frame. When the value of Slot_Number is equal to 0, no frame is sent out by the node WASi;
"Tree_Level", which is used to record the level of the hierarchical tree, in which the node WASi considered is located. The initial value of Tree_Level is equal to 0, meaning that the node WASi considered is not present in the hierarchical tree;
"To_be_optimized", which is used to indicate the fact that an optimization of the frame transmission index assigned to the node WASi is required. The initial value of To_be_optimized of the node WASi is FALSE. Once it has been determined that optimization is required, the value of the variable To_be_optimized associated with the node WASi considered becomes TRUE.

The use of these variables is described in detail here below in the description.

The generic node 200 also comprises:
a processing unit 201 (also called CPU) responsible for the management of the node 200, and more specifically adapted to implementing the algorithms for applying the determining method according to the particular embodiment of the invention, described here below with reference to FIGS. 6, 8 and 9.
a read-only memory (ROM) 203 used to store the program executed by the CPU 201.
a radio module 205 and its antenna 206 responsible for the transmission and reception of control and data information organized in a particular format. Preferably, the radio module 205 applies adapted error correction means ensuring transmission of greater reliability on the radio frequency used. According to the particular embodiment of the invention, the radio module 205 works around the 60 GHz radio frequency channel. The level of transmission power does not enable all the nodes of the communications network 100 to receive information from any node of the network;
a power supply module 207 responsible for supplying energy to all the components described here above.

During a transmission of data on the 7.1 home cinema network 100 implementing DSP (Digital signal processor) decoder type processor means, the WSC node 101 retrieves data from different audio channels designed to be processed by the nodes WASi each being associated with a given audio channel. This data is then organized within a frame to enable each WAS to extract the data intended for it. For example, the audio channel associated with a given WASi is identified by a piece of specific information such as the identifier of the node WASi. Then this data is sent to the radio module 205 of the WSC node 101.

Thus, after reception of a frame sent by the WSC node 101, each node WASi can extract and process the pieces of audio data intended for it from the received signal and then send these pieces of data to its associated media renderer device, which is an amplified audio speaker in the particular embodiment of the invention.

Should the generic node 200 be a node WASi, it includes a single antenna 206.

Should the generic node 200 be the WSC node 101, this node 101 includes, as indicated here above, the first antenna R (also referenced 206) and the second antenna L (also referenced 210). The presence in the WSC node of two antennas provides for spatial diversity of emission so as to attenuate or even totally cancel a shadowing of the WSC node 101.

Figure 3:
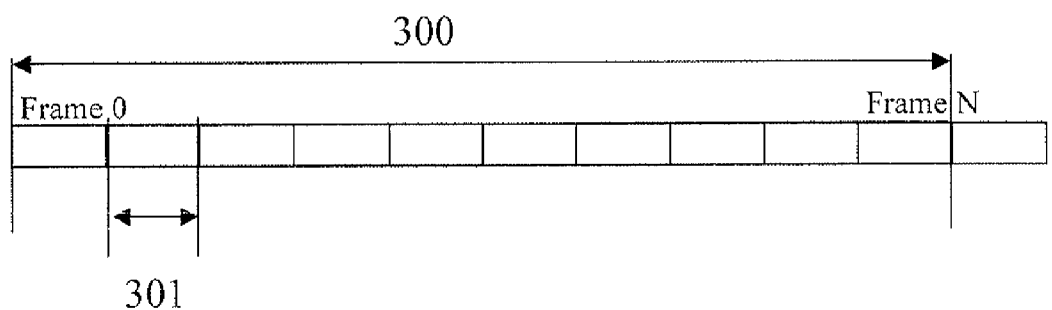
FIG. 3 illustrates the structure of a transmission super-frame according to the particular embodiment of the invention.

Referring to FIG. 3, the structure of a super-frame transmitted on the communications network 100 is presented.

The super-frame structure 300 is periodically repeated at the rhythm of the network cycles.

The super-frame 300 includes frames 301 in which each of the nodes of the network 100 (WSC node or node WASi) can transmit audio data and control data alternately.

Two frames are sent by the WSC node 101 (or transmitter node) since it transmits data using two antennas (206 and 210). The data contained in the first frame is identical to the data contained in the second frame to ensure the reception of data transmitted by the WSC node by a majority of nodes WASi (or receiver nodes) of the network.

For example, should the variable "NB_WAS" be the total number of node WASis, the super-frame considered of the communications network 100 comprises NB_WAS+2 frames 301 (the first two frames being sent out by the WSC node 101).

FIG. 3 provides a representation of the structure of a super-frame transmitted on the communications network 100, the transmission time of which is equal to the duration of one cycle of the communications network 100. Thus, for the sake of simplification, this representation does not take account of the waiting time intervals between frames necessary to compensate for the jitter inherent in the wireless communications network 100 and the waiting time intervals between network cycles necessary for the synchronization of the clocks of the different nodes of the communications network 100.

Furthermore, each node WASi repeats the data of the WSC node 101 in the frame 301 that it sends. Thus other nodes WASi can receive the data from the WSC node 101 even when they are initially not able to receive this data directly from the WSC node 101.

The order of transmission of the sequence of frames 301 of the super-frame 300 (also called a sequence of access) considered is stored in a frame transmission order table SF_Allocation of a size equal to NB_WAS+2.

In the transmission order table, each unallocated index has an associated value equal to 0 and each index allocated to a node WASi has an associated value equal to an identifier proper to this node (the identifier proper to these nodes WASi being non-zero).

As explained here below with reference to FIG. 5, following an initialization phase, the WSC node 101 determines the neighboring node tables or "neighbor tables" coming from the nodes WASi.

In this initialization phase, a predetermined frame transmission order table (or network access) is used. For example, this predefined table may be: SF_Allocation={WSC-L, WSC-R, WAS1, WAS2, WAS3, WAS4, WAS5, WAS6, WAS7, WAS8}.

During the initialization phase and according to the predefined sequence of access to the above-mentioned network, each node WASi provides RSSI (received signal strength indicator) information elements, namely information representing a communications level, referenced Rinfo(WASi), in order to fill a general table of RSSI information elements referenced RSSI_Elt described here below with reference to FIG. 4.

Thus, referring to FIG. 4, we present the structure of a general table of RSSI information elements (RSSI_Elt) 900 according to the particular embodiment of the invention.

The general table of RSSI information elements 900 comprises N RSSI information elements (or Rinfo(WASi)) 905, N being equal to the total number of nodes WASi (N=8 in the context of the particular embodiment of the invention) corresponding to the value of the variable NB_WAS.

Each node WASi of the communications network 100 transmits the RSSI information elements corresponding to a received signal power indicator (or a communication level) when each of the other nodes, whether WSC or WAS, of the communications network 100 transmits. Furthermore, each node WASi of the communications network 100 transmits the RSSI information elements already obtained from the other node WASis of the communications network 100. This ensures that the WSC node, shadowed from a node WASi by an obstacle, can nevertheless remember the RSSI information elements given by said node WASi.

The RSSI (or Rinfo(WASi)) information elements 905 of a given node WASi comprises:

NB_WAS+1=9 RSSI signal level indicator values (referenced Rx) (information pertaining to information reception capacity) measured in reception by the node WASi, either during the transmission of the two first frames of the transmission cycle on the communications network, these first two frames being transmitted by the WSC node 101, or during the frame by frame transmission by each of the WASj nodes (with j different from i). Each RSSI indicator measured by the node WASi may be allocated a value indicating that no measurement is possible, the node WASi being incapable of receiving data coming from the WSC node 101 or from a WASj node (j different from i). For each node WASi of the network 100, the order of the sequence of RSSI indicators of an RSSI information element (or Rinfo(WASi)) is predefined and known to the WSC node 101. For example, for the node WAS2, the order of the sequence of RSSI indicators Rx is {R0, R1, R2, R4, ..., R(NB_WAS+1)} where Rx corresponds to the RSSI indicator measured for the frame in position (or index) x in the super-frame transmitted. Thus, this example corresponds to the measurement by the WAS2 node of the RSSI signal level indicators respectively when the first antenna referenced L or WSC-L (associated with the indicator R0) of the WSC node transmits, the second antenna referenced R or WSC-R (associated with the indicator R1) transmits, the antenna of the node WAS1 (associated with the indicator R2) transmits, the antenna of the node WAS3 (associated with the indicator R4) transmits, ..., the antenna of the node WAS8 (associated with the indicator R9) transmits in the case of the above-mentioned order of RSSI indicators;

an update counter which is modified by the node WASi whenever a new measurement is made and added to the RSSI information element 905.

After the transmission of at least one complete super-frame, each node WASi is capable of filling its own RSSI information element 905 with the most recent information since the other (WASi or WSC) nodes have transmitted data at least once on the communications network 100.

For a given node WASi (example the WAS2 node), the RSSI information element Rinfo(WAS2) includes its own measurement table for RSSI indicators (hereafter called an "RSSI table") measured when other nodes of the communications network 100 transmit data. The other RSSI information elements (for example Rinfo(WAS1), Rinfo(WAS3), ... Rinfo(WASN)) are used by the node WAS2 to relay the RSSI tables of the associated WASj nodes (j different from i) and send them to the WSC node 101 (especially in order to secure the reception by this node of the RSSI tables when a masking or shadowing occurs).

To guarantee the relaying of the updated RSSI tables, at the reception of the RSSI tables coming from the WASj nodes (with j different from i), a given node WASi, after an initialization step performed when the system starts up, during which the update counters for the RSSI information elements Rinfo(WASj) are set at 0, implements the following steps upon reception of these RSSI tables: —a verification step: the node WASi verifies the value of the update counters for the information elements Rinfo(WASk) of the general table 900, for k=1 to N (k different from i). Should the value of the counter of an information element Rinfo(WASk) of the general table 900 be lower than value of the counter of the element Rinfo(WASk) newly received by the node WASi, the information Rinfo(WASk) of the general table 900 must be updated with the content of Rinfo(WASk) received previously. If not, the information element Rinfo(WASk) of the general table 900 is already updated.

In the context of the building of the general table 900, using the above-mentioned method of transmission and relaying of the RSSI tables, the WSC node 101 is capable of receiving all the RSSI tables of each node WASi, including the tables of the node WASis that are incapable of transmitting data directly to the WSC node 101 (because of permanent shadowing).

Referring to FIG. 5, examples are presented of tables of neighboring nodes associated with the nodes of the communications network 100, collected or obtained by the WSC node 101 during the above-mentioned phase of initialization of the communications network 100.

Once the RSSI information elements have been retrieved by the WSC node according to the procedure described with reference to FIG. 4, the WSC node can build the tables (referenced $NT_{WASi}$) of neighboring nodes associated with each of the node WASis of the network as well as the tables of neighboring nodes associated with the left antenna L (or WSC-L) and right antenna R (or WSC-R) of the WSC node (the tables being respectively referenced $NT_{WSC-L}$ and $NT_{WSC-R}$).

Indeed, since the RSSI information elements represent an indication of received signal power (or a communications level), for each node WASi, the WSC node can determine the nodes of the communications network from which it can receive data with sufficient power level (or communications level). If the power level corresponding to a piece of RSSI information is lower than a predefined threshold, the WSC node will conclude that the communication between the nodes concerned does not offer sufficient reliability and that a link of this kind cannot be kept in the hierarchical tree targeted by the algorithm of FIG. 6. In other words, the WSC node, in determining the hierarchical tree, keeps only the links corresponding to a piece of information on communications level higher than a predefined threshold.

Thus, at the end of the resetting or initialization phase described with reference to FIG. 4, the WSC node 101 has obtained the tables of neighboring nodes of each of the nodes WASi as well as those of the antennas WSC-R and WSC-L.

Thus, for example, a table of neighboring nodes ($NT_{WASi}$) associated with a node WASi comprises a list of nodes among the nodes WASj (j different from i), and among the antennas WSC-R and WSC-L of the WSC node 101 for which the node WASi has an RSSI indicator value above a given threshold.

Preferably the nodes WASj (j different from i) carried into the table of neighboring nodes of the node WASi are classified by an increasing RSSI indicator value.

In the context of the example of FIG. 5, using the tables of the above-mentioned neighboring nodes, it is perceived for example that the node WAS2 can receive data only from the node WAS1 and from the node WAS3, and that the node WAS1 can receive data from the right-hand antenna of the node WSC 101 (or WSC-R).

Thus, if the order of transmission of the frames of the super-frame is defined by SF_Allocation={WSC-L, WSC-R, WAS1, WAS2, WAS3, WAS4, WAS5, WAS6, WAS7, WAS8}, the node WAS1, in taking account of the processing time at the reception of data, is not capable of free transmitting the data delivered by the WSC node 101 during the same network cycle. Consequently, the node WAS2 relies solely on the node WAS3 to receive the data delivered by the node WSC 101 during the same network cycle.

When a shadowing appears in the course of the transmission of data by the node WAS3, a time lag in the delivery of the data N is introduced at the level of the node WAS2, the node WAS1 being only capable of retransmitting the data of a network cycle N in the super-frame of the next network cycle N+1. The determining method according to the particular embodiment of the invention is used to reduce the transmission time in the network of this data in contributing in order of transmission of the sequence of frames that is optimized as a function of the topology of the network.

Referring to FIG. 6, we present the main steps of an algorithm for building a hierarchical tree whose root is the WSC node 101 according to the particular embodiment of the invention. This algorithm is executed by the CPU 201 of the WSC node 101.

In a step 500, the WSC node 101 obtains all the neighbor tables associated with the different nodes WASi as described here above.

Then, in a step 505, the WSC node 101 obtains and then sorts out its own neighbor tables $NT_{WSC-L}$ and $NT_{WSC-R}$.

The step 505 is used to verify that a given node WASi is identified as a neighboring node belonging to a first relay level of the tree (or "one hop" level) for each radio antenna 206 and 210 of the WSC node 101.

When a node WASi considered is identified as being a neighboring relay node (also called a relay receiver node) of the first level (for example the node WAS1 of FIG. 5) for each of the radio antennas 206 and 210 of the WSC node 101, this node uses a criteria of best reception to set up the hierarchical tree.

Furthermore, this sorting operation can take account of a criterion (also called a balancing criterion) based on the size of the neighbor table to perform the most equitable possible distribution of the neighbor relay or hop nodes of the first level, on each antenna 206 and 210 of the WSC node 101.

Thus, when a node WASi is present in both tables with an equivalent RSSI signal level indicator, the method is aimed at trying to obtain a situation where the size of the table $NT_{WSC-L}$ is almost equal to that of the table $NT_{WSC-R}$. This is done by the elimination, from the biggest sized table, of the identifier of the node WASi present in both tables.

Thus, after implementation of the step 505, the simplified tables corresponding to the tables $NT_{WSC-L}$ and $NT_{WSC-R}$ respectively include {WAS5, WAS6, WAS7} and {WAS1, WAS3}.

In a step 510, the initialization of the variables dedicated to the creation of a hierarchical tree is performed.

Thus, in this step 510, a variable known as "Table_In_Use" is allocated to an identifier of the table $NT_{WSC-L}$ in order to indicate that the analysis starts by the processing of the neighbor table from the viewpoint of the left-hand antenna of the WSC node.

Furthermore, a "Current_tree_level" variable set at 1 to indicate that the processing in progress determines the first relay level or first hop level of the hierarchical tree starting from the WSC node 101.

Furthermore, a variable "NB_WAS_in_Tree", used to ascertain that all the nodes WASi have been taken into account for the creation of the tree, is set at 0.

In a step 515, each node of the neighbor table identified by the variable Table_In_Use is obtained incrementally, then added to the relay level or hop level of the hierarchical tree specified by the Current_tree_level variable.

As soon as a node WASi is added to the hierarchical tree, the NB_WAS_in_Tree variable is incremented by one unit.

Then, the value Nb_Parents of the node WASi considered is incremented by one unit, and the variable considered Tree level takes the value of the variable Current_tree_level.

In a step 520, a check is made to see whether the node WASi of the neighbor table considered that has been added is the last of the table.

In the event of a negative verification at the step 520, the next node of the table is processed in the step 515.

In the event of a positive verification of the step 520, it is ascertained in a step 525 that the analysis has been made for both antennas of the WSC node 101. This check consists in verifying that the value of the variable Table_In_Use is different from $NT_{WSC-R}$.

In the event of a negative verification at the step 525, a step 530 consists in allocating the value $NT_{WSC-R}$ to the variable Table_In_Use in order to carry out the analysis of the second table of the WSC node 101. The steps 515 to 525 are then executed identically to what was described here above.

In the event of positive verification of the step 525, the first step of creation of the hierarchical tree has been performed. The result of this first step of creation is a first hop level (as illustrated in FIG. 7 described here below) in which a first branch set up from the left antenna of the WSC node 101 (referenced WSC-L) is formed by WAS5, WAS6 and WAS7, and a second branch set up from the right-hand antenna (referenced WSC-R) is formed by WAS1 and WAS3.

Following positive verification at the step 525, it is ascertained in a step 535 that all the WASi are already elements of the hierarchical tree in verifying that NB_WAS_in_Tree is equal to NB_WAS.

In the event of negative verification at the step 535, any new node WASi to be added to the tree is a node of the second hop level from the viewpoint of the WSC node 101.

Thus, the variable Current_tree_level is implemented by one unit in a step 540.

The description now relates to the study of the neighbor tables for each node WASi belonging to the first hop level of the hierarchical tree.

In a step 545, one of the neighbor tables for nodes neighboring the node WASi, named $NT_{WAS-x}$ is studied. For example, starting from FIG. 6 and maintaining the order of study of the first step in the creation of the hierarchical tree, a study is made of the tables of the first-level relay or hop nodes for the tree considered in the following order: $NT_{WAS-5}$, $NT_{WAS-6}$, $NT_{WAS-7}$, then $NT_{WAS-1}$, and $NT_{WAS-3}$.

Thus, starting from the first table $NT_{WAS-5}$, in a step 550, it is ascertained hat the nodes of this table have not been previously added to the first hop level of the hierarchical tree. This verification can be done by verifying, for a node WASi, that the Tree_Level variable is not zero (initial value) and is lower than the variable Current_tree_level.

When a node WASi has not yet been added to the hierarchical tree, a check is made, in a following step 555, to see whether this node WASi is present at the hop level under study of the hierarchical tree (for example in verifying that the variable Tree_Level associated with it is equal to the variable Current_tree_level) and that the variable Nb_Parents associated with it is at least equal to 2 (which is an example of the rules of spatial diversity).

When this is not the case (either the node WASi is not in the hierarchical tree at the hop level being studied or it is already in the tree but has only one parent), the node WASi is added to the hierarchical tree, in a step 560, in allocating the variable Tree_Level, associated with it the value of the variable Current_tree_level and in incrementing the variable Nb_Parents by one unit.

Furthermore, the counter NB_WAS_in_Tree is implemented by one unit only if the variable Tree_Level is not equal to the variable Current_tree_level before the execution of the step 560 (so as not to count the insertion of the node WASi into the hierarchical tree twice).

In the event of positive verification at the steps 550 and 555 or after execution of the step 560, it is ascertained, in a step 565, that all the nodes of the neighbor table of nodes neighboring the node WASi considered have been analyzed.

In the event of negative verification of the step 565, the algorithm returns to the step 545.

In the event of positive verification at the step 565, it is ascertained in a step 570 that all the tables of the hop level studied (corresponding to the value of the variable Current_tree_level) of the tree have been analyzed.

In the event of negative verification at the step 570, a study is made, in a step 575, of the neighbor table of nodes neighboring the following node belonging to the hop level studied of the hierarchical tree, the steps of analysis and of creation of the tree starting again at the step 545.

In the event of positive verification step 570 (all the tables of the hop level considered have been analyzed), it is ascertained, in a step 535, that all the nodes WASi have been included in the hierarchical tree.

Thus, in the present example, after study of all the tables of the nodes of the first hop level as illustrated in FIG. 7 described here below, all the nodes WASi are in the tree and the positive verification of the step 535 leads to the execution of the last step 580 of the algorithm.

Nevertheless, if this is not the case, the algorithm continues the study of the tables of the second hop level in restarting all the operations described in the steps of 540 to 575.

Thus, in the step 580, each branch of the tree delivered, from the WSC node 101 (root node of the tree), is ordered, to then authorize the application of the transmission order determining algorithm described with reference to FIGS. 8 and 9.

Thus, in the step 580, the node WASi having the greatest number of children or offspring and having the maximum hop levels is determined. This classification is made for each node WASi of the first hop level. This leads, for the branch associated with the antenna WSC-L, to the following order of transmission of the frames: WAS6, WAS5 and WAS7, and for the branch associated with the antenna WSC-R it leads to the following order of transmission: WAS3, WAS1.

Thus, after the application of the algorithm of FIG. 6 and the use of the tables of the neighboring nodes of FIG. 5 according to the particular embodiment of the invention, the hierarchical tree shown in FIG. 7 is obtained.

Referring to FIG. 8, a description is provided of the main steps of the first part of an algorithm for determining the order of transmission of the sequence of frames of a super-frame according to the particular embodiment of the invention.

In a step 700, the WSC node 101 uses the first two frames to transmit data, respectively by its left antenna WSC-L and by its right antenna WSC-R. This leads to the partial allocation of the variable SF_Allocation={WSC-L, WSC-R, NU, NU, NU, NU, NU, NU, NU} where NU means that the index in the transmission sequence has not had been allocated.

In a step 705, a variable "Slot_Type" is initialized at the value "even" in order to carry out the analysis of the branch of the tree associated with the left antenna WSC-L of the WSC node 101 (transmitting in even-order frames 0) so as to allocate an even frame sequence number to each of the WAS nodes of the first hop level of the tree. This enables them, as relay nodes, to have sufficient processing time available to retransmit the data received to the receiver nodes that are destinations of hops (these nodes may also be relay nodes) of the next hop level (second hop level) in a frame of the super-frame N.

The variable Slot_Type indicates the even or odd character of a frame within the sequence of frames of the super-frame.

After the first analysis of all the nodes of the first hop level of the left branch WSC-L of the WSC node 101, the following determining of the transmission order table is performed: SF_Allocation={WSC-L, WSC-R, WAS6, NU, NU, NU, NU, NU, NU, NU}. The table presented here below summarizes the information on the nodes WASi stored in the RAM 202:

| WASi | Nb_Parents | Slot_Number | Tree_Level | To_be_optimized |
|------|-----------|-------------|------------|-----------------|
| WAS1 | 1 | 0 | 1 | FALSE |
| WAS2 | 2 | 0 | 2 | FALSE |
| WAS3 | 1 | 0 | 1 | FALSE |
| WAS4 | 2 | 0 | 2 | FALSE |
| WAS5 | 1 | 0 | 1 | FALSE |
| WAS6 | 1 | 2 | 1 | FALSE |
| WAS7 | 1 | 0 | 1 | FALSE |
| WAS8 | 2 | 0 | 2 | FALSE |

In the step 705, the variable Branch_Study is also initialized at the value WSC-L in order to start by the processing of the left branch of the hierarchical tree, i.e. the one associated with the antenna WSC-L.

In a step 710, the algorithm is set to start the determining of the index of transmission of the frames allocated to the nodes of the first hop level. To do this, the variable Current_tree_level is set at 1.

An operation of this kind complies with the hierarchy of the tree obtained after implementation of the tree-building algorithm described with reference to FIG. 6.

In a step 715, the first nodes WASi of the hierarchical tree are analyzed in starting with the left branch associated with the antenna WSC-L (in this case the node WAS6 as determined in the step 580), then in a step 720, a check is made to see if the node WASi considered has a child in the hierarchical tree.

In the event of positive verification at the step 720, a first determining of order of frames is made in a step 725 in allocating the first available frame that verifies the parity criterion laid down by the variable Slot_Type (which, in the present case, has the "even" value) in the frame transmission order table SF_Allocation.

After the step 720 has been performed, the operation leads to the following partial allocation of the frame transmission order table: SF_Allocation={WSC-L, WSC-R, WAS6, NU, NU, NU, NU, NU, NU, NU}, and to the setting of the information variable Slot_Number of the node WAS6 to the value 2 (corresponding to the order of transmission of the frame of the node WAS6 in the partially allocated table SF_Allocation).

In a step 730, it is verified that all the nodes WASi of the levels studied of the tree (identified by the variable Current_tree_level) have been taken into account in determining the order of transmission of the frames.

In the event of negative verification at the step 730 (as is the case for the nodes WAS5 and WAS7 of the example considered), the steps 715 to 730 are again executed.

When the verification of the step 720 is negative, no determining of frame transmission order is set up for the node studied because, since no other node is dependent on the node studied, this node can use any unspecified frame. In the example of the hierarchical network considered, the case here is that of the nodes WAS5 and WAS7, these two nodes having no children.

In the event of positive verification at the step 730, the following hop level (second hop level) of the hierarchical tree is studied in a step 735 to determine the index of transmission of the frames allocated to the nodes belonging to this second hop level of the left branch (associated with the antenna WSC-L).

In the step 735, the variable Current_tree_level is incremented by 1.

In a step 740, a node WASi of the hop level considered (in this case the second hop level) of the tree is analyzed.

In the case of the present example, for the branch WSC-L, the analysis of the second hop level of the step 740 consists in determining the frame transmission index allocated to the nodes WAS4 and WAS8.

In a step 745, it is verified that the frame transmission index allocated to the node WASi considered of the hop level considered in the sequence has not already been determined. This step 745 consists in verifying that the variable Slot_Number associated with it is not null.

In the event of negative verification at the step 745 (the variable Slot_Number associated with the node WASi is null), a new determining of the order in the sequence is done at a step 750 which allocates the first frame index available in the frame transmission order table SF_Allocation to the variable Slot_Number and verifies the parity criterion dictated by the parameter Slot_Type. The node WASi is henceforth analyzed.

In a step 755, it is verified that all the elements of the hop level represented by the variable Current_tree_level of the branch studied in the hierarchical tree have been analyzed.

In the event of negative verification of the step 755, the following node WASi is analyzed in the step 740 to 755.

In the event of positive verification at the step 755, it is verified in a step 765 that all the hop levels of the branch studied had been analyzed in comparing the value of the variable Current_tree_level with the maximum number of hop levels of the branch under study.

Thus, in the example considered, after study of the nodes WAS4 and WAS8, the determining of the order of the frames leads to the following partial allocation: SF_Allocation={WSC-L, WSC-R, WAS6, NU, WAS4, NU, WAS8, NU, NU, NU}.

The table presented here below summarizes the information on the WASi nodes stored in the RAM 202:

| WASi | Nb_Parents | Slot_Number | Tree_Level | To_be_optimized |
| --- | --- | --- | --- | --- |
| WAS1 | 1 | 0 | 1 | FALSE |
| WAS2 | 2 | 0 | 2 | FALSE |
| WAS3 | 1 | 0 | 1 | FALSE |
| WAS4 | 2 | 4 | 2 | FALSE |
| WAS5 | 1 | 0 | 1 | FALSE |
| WAS6 | 1 | 2 | 1 | FALSE |
| WAS7 | 1 | 0 | 1 | FALSE |
| WAS8 | 2 | 6 | 2 | FALSE |

It must be noted that, if the nodes WAS4 and WAS8 had a child (in the case of a left branch having a third hop level), the steps 740 to 765 would be repeated.

In a step 770, it is ascertained that the order of the frames has also been determined for the right branch of the hierarchical tree (associated with the right antenna WSC-R) in verifying that the value of the variable Branch_Study has taken the value WSC-R.

In the event of negative verification at the step 770 the variable Branch_Study, in a step 775 takes the value WSC-R in order to analyze the other branch of the hierarchical tree, and the variable Slot_Type takes the value "odd".

The step 775 is done before repeating the steps 710 to 765 described here above.

Thus, after the relay node level of the branch WSC-R (steps preceding the step 735) has been studied, the determining of frame order leads to the following partial allocation: SF_Allocation={WSC-L, WSC-R, WAS6, WAS3, WAS4, WAS1, WAS8, NU, NU, NU}.

The table presented here below summarizes the information on the WASi nodes stored in the RAM 202:

| WASi | Nb_Parents | Slot_Number | Tree_Level | To_be_optimized |
| --- | --- | --- | --- | --- |
| WASi1 | 1 | 5 | 1 | FALSE |
| WASi2 | 2 | 0 | 2 | FALSE |
| WASi3 | 1 | 3 | 1 | FALSE |
| WASi4 | 2 | 4 | 2 | FALSE |
| WASi5 | 1 | 0 | 1 | FALSE |
| WASi6 | 1 | 2 | 1 | FALSE |
| WASi7 | 1 | 0 | 1 | FALSE |
| WASi8 | 2 | 6 | 2 | FALSE |

At the step 745, the analysis of the second level of the branch WSC-R (including the nodes WAS4, WAS8 and WAS2) enables verification that the nodes WAS4 and WAS8 have already been analyzed.

Thus, in a step 760, the value TRUE is allocated to the variable To_be_optimized of the nodes WAS4 and WAS8 in order to subsequently check and see whether the frame transmission index assigned to each of these nodes can be optimized in order to enable them to receive data from their various parents in the hierarchical tree.

The steps 755 to 770 are then entirely repeated.

At the end of this algorithm, the variable Branch_Study has the value WSC-R, and following the positive verification at the step 770, the method of the invention executes the second part of the determining algorithm described here below with reference to FIG. 9.

The determining of the order of the frames leads to the following partial allocation SF_Allocation={WSC-L, WSC-R, WAS6, WAS3, WAS4, WAS1, WAS8, WAS2, NU, NU}.

The table presented here below summarizes the information on the WASi nodes stored in the RAM 202:

| WASi | Nb_Parents | Slot_Number | Tree_Level | To_be_optimized |
| --- | --- | --- | --- | --- |
| WAS1 | 1 | 5 | 1 | FALSE |
| WAS2 | 2 | 7 | 2 | FALSE |
| WAS3 | 1 | 3 | 1 | FALSE |
| WAS4 | 2 | 4 | 2 | TRUE |
| WAS5 | 1 | 0 | 1 | FALSE |
| WAS6 | 1 | 2 | 1 | FALSE |
| WAS7 | 1 | 0 | 1 | FALSE |
| WAS8 | 2 | 6 | 2 | TRUE |

Referring to FIG. 9, a description is provided of the main steps of the second part of the algorithm for determining the order of transmission of a sequence of frames of a super-frame according to the particular embodiment of the invention.

The second part of the determining algorithm is used to optimize, when possible, the frame transmission order to enable the reception, by a WASi node, of the signals coming from several parents of said WASi node before it transmits its frame in the super-frame.

In a first step 800, the optimizing phase starts with the study of the level from which it is possible to have multiple parents. In the case described here above, this corresponds to the second level of the hierarchical tree of FIG. 7 (the variable Current_tree_level is equal to 2). It must be noted that a possible optimization of this initialization is the initialization of the variable Current_tree_level at the value of the hop level subjected to the lowest optimization determined during the step 760 of FIG. 8).

In a step 805, each node WASi of the hop level studied, having an associated variable Tree_Level value equal to the value of the variable Current_tree_level, is analyzed.

In a step 810, a check is made to see whether an analysis of optimization of a given node is required (the variable To_be_optimized is then equal to the value TRUE) to improve the frame transmission order.

In the event of negative verification at the step 810 (To_be_optimized equal to the value FALSE), in a step 830, the frame transmission index allocated to the node WASi considered is not modified (the variable Slot_Number associated with WASi is unchanged) and the node WASi is listed as "analyzed" (the variable To_be_optimized associated with the node WASi being reset at FALSE).

In the event of positive verification at the step 810 (an analysis of optimization is required), it is verified at a step 815 that the frame transmitted in sequence by the node WASi considered is at a distance of at least two frames from the frames transmitted in the sequence by the parents of the node WASi, for example in comparing the values of the variables Slot_Number of the node WASi and of its parent nodes (i.e. there is a frame planned in the sequence between the element "NU" and the frames allocated to the parents of the node WASi).

In the event of positive verification in the step 815, the frame transmission index allocated to the node WASi is already optimal. It is therefore not necessary to modify the order of the frame of the node WASi considered.

Thus, the value of To_be_optimized of the WASi node considered may take the value FALSE (step 830) (this is for example the case with the node WAS8).

Indeed, at least one frame between the frame transmitted by the node WASi and the ones sent by its parents is necessary so that the node WASi has sufficient time available to process the data received (concealed errors, preparation of data for retransmission etc).

In the event of negative verification in the step 815 (i.e. if the frame transmission index allocated to the node WASi is not optimal), a check is made, in a step 820, to find out if there is a frame free enabling the node WASi considered to receive data from its parents.

The verification of the step 820 may consist of a search for an unused element "NU" of the transmission order table SF_Allocation for which the order (or index) of transmission is greater by at least two units relative to the maximum of the variable Slot_Number associated with the frames allocated to the parents of the node WASi (i.e. there is a frame planned in the sequence between the element "NU" and the frames allocated to the parents of the node WASi).

It must be noted that this checking operation could be applied during the step 750 of the first part of the algorithm described with reference to FIG. 8 when no frame index corresponding to the parity criterion defined by the variable Slot_Type is available.

In the event of positive verification at the step 820, in a step 825, the frame transmission index allocated to the analyzed node WASi is modified by the allocation to it of the location of the corresponding element NU (the value SF_Allocation [location of NU] takes the value "WASi", the value SF_Allocation[Slot_Number of WASi] takes the value 0 and the variable Slot_Number of WASi takes the value of the location previously occupied by the element NU considered in the order of transmission).

Simultaneously, the value of the variable To_be_optimized of the node WASi considered takes the value FALSE, and the value of the variable Slot_Number associated with the node WASi is updated with the value of the variable of the frame NU considered.

In the example considered, the characteristics of the node WAS4 are then modified.

In a step 835, it is verified that all the nodes which belong, according to the hierarchical tree, to the hop level identified by Current_tree_level have been optimized.

In the event of negative verification at the step 835, the steps 805 to 830 repeated for the following node WASi.

In the event of positive verification of the step 835, the variable Current_tree_level is increased by one unit to enable an analysis of optimization of subsequent determining of order of the other levels of the tree in a step 840.

A verification step 845 is used to check on whether all the hop levels of the tree have undergone an optimization analysis.

In the event of negative verification at the step 845, the processing operations 805 to 840 repeated.

In the event of positive verification at the step 845, a step 850 is implemented.

The determining of order of the frames leads to the following partial allocation of SF_Allocation={WSC-L, WSC-R, WAS3, WAS3, NU, WAS1, WAS8, WAS2, WAS4, NU}.

The table presented here below summarizes the information on the WASi nodes stored in the RAM 202:

| WASi | Nb_Parents | Slot_Number | Tree_Level | To_be_optimized |
|------|------------|-------------|------------|-----------------|
| WAS1 | 1 | 5 | 1 | FALSE |
| WAS2 | 2 | 7 | 2 | FALSE |
| WAS3 | 1 | 3 | 1 | FALSE |
| WAS4 | 2 | 8 | 2 | FALSE |
| WAS5 | 1 | 0 | 1 | FALSE |
| WAS6 | 1 | 2 | 1 | FALSE |

-continued

| WASi | Nb_Parents | Slot_Number | Tree_Level | To_be_optimized |
|---|---|---|---|---|
| WAS7 | 1 | 0 | 1 | FALSE |
| WAS8 | 2 | 6 | 2 | FALSE |

In a step 850, an examination is carried out to find out if there are remaining WASi nodes to which no index in the transmission sequence has been allocated, in verifying that the value of the variable Slot_Number associated with them is equal to 0.

In the event of negative verification at the step 850 (all the WASi nodes have been allocated an index in the transmission sequence), the determining algorithm stops in a step 860.

If there is positive verification at the step 850, then a step 855 is used to determine the first free index which will be allocated to the node considered (to which no index in the transmission sequence has yet been allocated) and then the operation returns to the step 850. The node considered is determined as being "determined".

The complete determining of the order of the frames leads to the following order determination table: SF_Allocation={WSC-L, WSC-R, WAS6, WAS3, WAS5, WAS1, WAS8, WAS2, WAS4, WAS7}.

The table presented here below summarizes the information on the WASi nodes stored in the RAM 202:

| WASi | Nb_Parents | Slot_Number | Tree_Level | To_be_optimized |
|---|---|---|---|---|
| WAS1 | 1 | 5 | 1 | FALSE |
| WAS2 | 2 | 7 | 2 | FALSE |
| WAS3 | 1 | 3 | 1 | FALSE |
| WAS4 | 2 | 8 | 2 | FALSE |
| WAS5 | 1 | 4 | 1 | FALSE |
| WAS6 | 1 | 2 | 1 | FALSE |
| WAS7 | 1 | 9 | 1 | FALSE |
| WAS8 | 2 | 6 | 2 | FALSE |

After the determining of the frame transmission order table, a processing operation making it possible to broadcast the new frame transmission order to the different nodes of the network (as well as the super-frame using this order) can be implemented according to the same principle as the one applied to the propagation of the RSSI tables described here above with reference to FIG. 4.

The invention claimed is:

1. A method for determining a sequence of access to a communications network by a plurality of nodes in a broadcasting of a content by a transmitter node to a set of receiver nodes, at least one receiver node having to receive said content by a relay receiver node, wherein said method comprises the following steps implemented by a manager device:
for each receiver node, determining at least one filial link with at least one other node, a filial link existing between two nodes when a direct communication between the two nodes is possible;
determining a hierarchical tree whose root is the transmitter node, on the basis of a selection of a set of determined filial links, as a function of at least one rule of diversity, said hierarchical tree defining at least one relay receiver node and enabling the reception of the content by the set of receiver nodes; and
determining said sequence of access from the hierarchical tree so that, between access by said relay receiver node or nodes and access by the receiver node or nodes linked to it or to them by the filial links of said hierarchical tree, the sequence of access provides that at least one of said plurality of nodes will access the communications network.

2. The determining method according to claim 1, wherein the determining of the at least one filial link includes a step for determining a piece of information representing a level of communications between the nodes of the communications network and in that the determining of the hierarchical tree is done as a function of said piece or pieces of information representing the level of communication.

3. The determining method according to claim 2, wherein one of said rules of diversity requires that a determined filial link should be selected to determine the hierarchical tree if the information representing the level of communications between the nodes linked by said filial link is greater than a predetermined threshold.

4. The determining method according to claim 1, wherein one of said rules of diversity requires that each of the receiver nodes should have multiple links in the hierarchical tree enabling each of the receiver nodes to receive the content.

5. The determining method according to claim 1, wherein the transmitter node has several antennas enabling access to the communications network, and wherein the hierarchical tree is constituted by as many branches as there are transmitter node antennas, and one of said rules of diversity dictates a balancing of the hierarchical tree relative to the transmitter node.

6. The determining method according to claim 1, wherein said sequence furthermore provides for access by a first receiver node to the communications network before a second receiver node in the sequence if at least one of the following criteria is verified:
the first receiver node has a filial link with the transmitter node while the second receiver node has no filial link with the transmitter node;
the first receiver node is a relay receiver node while the second receiver node is not a relay receiver node;
the first and second receiver nodes being relay receiver nodes to enable the reception of the content at respectively first and second relay recipient receiver nodes, the number of the first relay recipient receiver nodes is greater than the number of the second relay recipient receiver nodes; and
the first and second receiver nodes being relay receiver nodes to enable the reception of the content at respectively first and second relay recipient receiver nodes, at least one of the first relay recipient receiver nodes is a relay node while none of the second relay recipient receiver nodes is a relay node.

7. A non-transitory computer-readable storage memory, which may be totally or partially detachable, storing a set of instructions executable by a computer to implement steps for determining a sequence of access to a communications network by a plurality of nodes in a broadcasting of a content by a transmitter node to a set of receiver nodes, at least one receiver node having to receive said content by a relay receiver node, wherein said steps further comprises the following
- for each receiver node, determining at least one filial link with at least one other node, a filial link existing between two nodes when a direct communication between the two nodes is possible;
- determining a hierarchical tree whose root is the transmitter node, on the basis of a selection of a set of determined filial links, as a function of at least one rule of diversity, said hierarchical tree defining at least one relay receiver node and enabling the reception of the content by the set of receiver nodes; and
- determining said sequence of access form the hierarchical tree so that, between access by said relay receiver node or nodes and access by the receiver node or nodes linked to it or to them by the filial links of said hierarchical tree, the sequence of access provides that at least one of said plurality of nodes will access the communications network.

8. A manager device to determine a sequence of access to a communications network by a plurality of nodes in a broadcasting of a content by a transmitter node to a set of receiver nodes, at least one receiver node having to receive said content by a relay receiver node, wherein said manager device comprises:
- means of determining, for each receiver node, at least one filial link with at least one other node, a filial link existing between two nodes when a direct communication between the two nodes is possible;
- means of determining a hierarchical tree whose root is the transmitter node, on the basis of a selection of a set of determined filial links, as a function of at least one rule of diversity, said hierarchical tree defining at least one relay receiver node and enabling the reception of the content by the set of receiver nodes; and
- means of determining said sequence of access from the hierarchical tree so that, between access by said relay receiver node or nodes and access by the receiver node or nodes linked to it or to them by the filial links of said hierarchical tree, the sequence of access provides that at least one of said plurality of nodes will access the communications network.

9. The manager device according to claim 8, wherein the means of determining the at least one filial link comprise means of determining a piece of information representing a level of communications between the nodes of the communications network and wherein the means of determining the hierarchical tree comprise means for taking account of said piece or pieces of information representing the level of communication.

10. The manager device according to claim 9, wherein one of said rules of diversity requires that a determined filial link should be selected to determine the hierarchical tree if the information representing the level of communications between the nodes linked by said filial link is greater than a predetermined threshold.

11. The manager device according to claim 8, wherein one of said rules of diversity requires that each of the receiver nodes should have multiple links in the hierarchical tree enabling each of the receiver nodes to receive the content.

12. The manager device according to claim 8, wherein the transmitter node has several antennas for access to the communications network, and wherein the hierarchical tree is constituted by as many branches as there are transmitter node antennas, and one of said rules of diversity dictates a balancing of the hierarchical tree relative to the transmitter node.

13. The manager device according to claim 8, wherein said means for determining said sequence of access are such that said sequence furthermore provides for access by a first receiver node to the communications network before a second receiver node in the sequence if at least one of the following criteria is verified:
- the first receiver node has a filial link with the transmitter node while the second receiver node has no filial link with the transmitter node;
- the first receiver node is a relay receiver node while the second receiver node is not a relay receiver node;
- the first and second receiver nodes being relay receiver nodes to enable the reception of the content at respectively first and second relay recipient receiver nodes, the number of the first relay recipient receiver nodes is greater than the number of the second relay recipient receiver nodes; and
- the first and second receiver nodes being relay receiver nodes to enable the reception of the content at respectively first and second relay recipient receiver nodes, at least one of the first relay recipient receiver nodes is a relay node while none of the second relay recipient receiver nodes is a relay node.

* * * * *